(12) United States Patent
Dirksen

(10) Patent No.: US 6,732,580 B2
(45) Date of Patent: May 11, 2004

(54) LEVEL SENSOR AND CONTROL

(76) Inventor: Larry E. Dirksen, 1385 Caminito Floreo, La Jolla, CA (US) 92037

(*) Notice: Subject to any disclaimer, the term of this patent is extended or adjusted under 35 U.S.C. 154(b) by 0 days.

(21) Appl. No.: 10/154,959

(22) Filed: May 24, 2002

(65) Prior Publication Data

US 2003/0217596 A1 Nov. 27, 2003

(51) Int. Cl.$^7$ .......................... G01F 23/20; G01F 22/02
(52) U.S. Cl. ...................... 73/149; 149/296; 149/309; 149/290 B; 149/310
(58) Field of Search .................... 73/32, 29, 149, 73/309, 433, 437

(56) References Cited

U.S. PATENT DOCUMENTS

| | | | |
|---|---|---|---|
| 4,276,774 A | 7/1981 | McGookin | 73/290 B |
| 4,676,099 A | 6/1987 | McGookin | 73/290 B |
| 4,910,878 A | 3/1990 | Fleckenstein et al. | 33/179 |
| 5,157,968 A | * 10/1992 | Zfira | 73/149 |
| 5,493,903 A | * 2/1996 | Allen | 73/149 |
| 5,526,683 A | * 6/1996 | Maggio | 73/149 |
| 5,614,672 A | * 3/1997 | Legendre et al. | 73/437 |
| 5,979,703 A | * 11/1999 | Nystrom | 222/58 |

FOREIGN PATENT DOCUMENTS

| | | | | |
|---|---|---|---|---|
| FR | 1 405 203 | 12/1965 | | |
| SU | 438 881 | 5/1978 | ........... | G01F/23/14 |
| WO | WO 9102949 A1 * | 3/1991 | ........... | G01F/23/22 |

OTHER PUBLICATIONS

Guyer, Paul, G73–14–A Grain Processing for Feedlot Cattle, Revised 1976 [online], [retrieved on May 5, 2003] Retrieved from Internet at <URL:http://www.ianr.unl.edu/pubs/beef/g14.htm>.*

* cited by examiner

Primary Examiner—Hezron Williams
Assistant Examiner—David A. Rogers
(74) Attorney, Agent, or Firm—Kyle W. Rost

(57) ABSTRACT

A sensor for measuring the level of free-flowing particulate material in a storage bin comprises an electronic load cell fixedly positionable at the upper end of the storage bin and having a cable suspended therefrom in the storage bin. The lower end of the cable is adjacent the lower end of the storage bin so that the load of the cable alone causes of the electronic load cell to provide a first signal to a process controller indicative of an empty storage bin. The load of the cable plus the downward force of any particulate material in the storage bin on the cable causes the electronic load cell to provide a second output signal to the process controller proportional to the amount of particulate material in the storage bin. The process controller provides a low level output signal to a conveyor system for filling the storage bin when the level of the particulate material in the storage bin matches a predetermined low level and discontinues the low level output signal when the level of the particulate material in the storage bin matches a predetermined high level. The process controller, which includes a clock, also can provide a real time readout of the rate of discharge of the particulate material from the storage bin. Since the process controller can be located at any remote location, this discharge rate can be monitored anywhere.

9 Claims, 2 Drawing Sheets

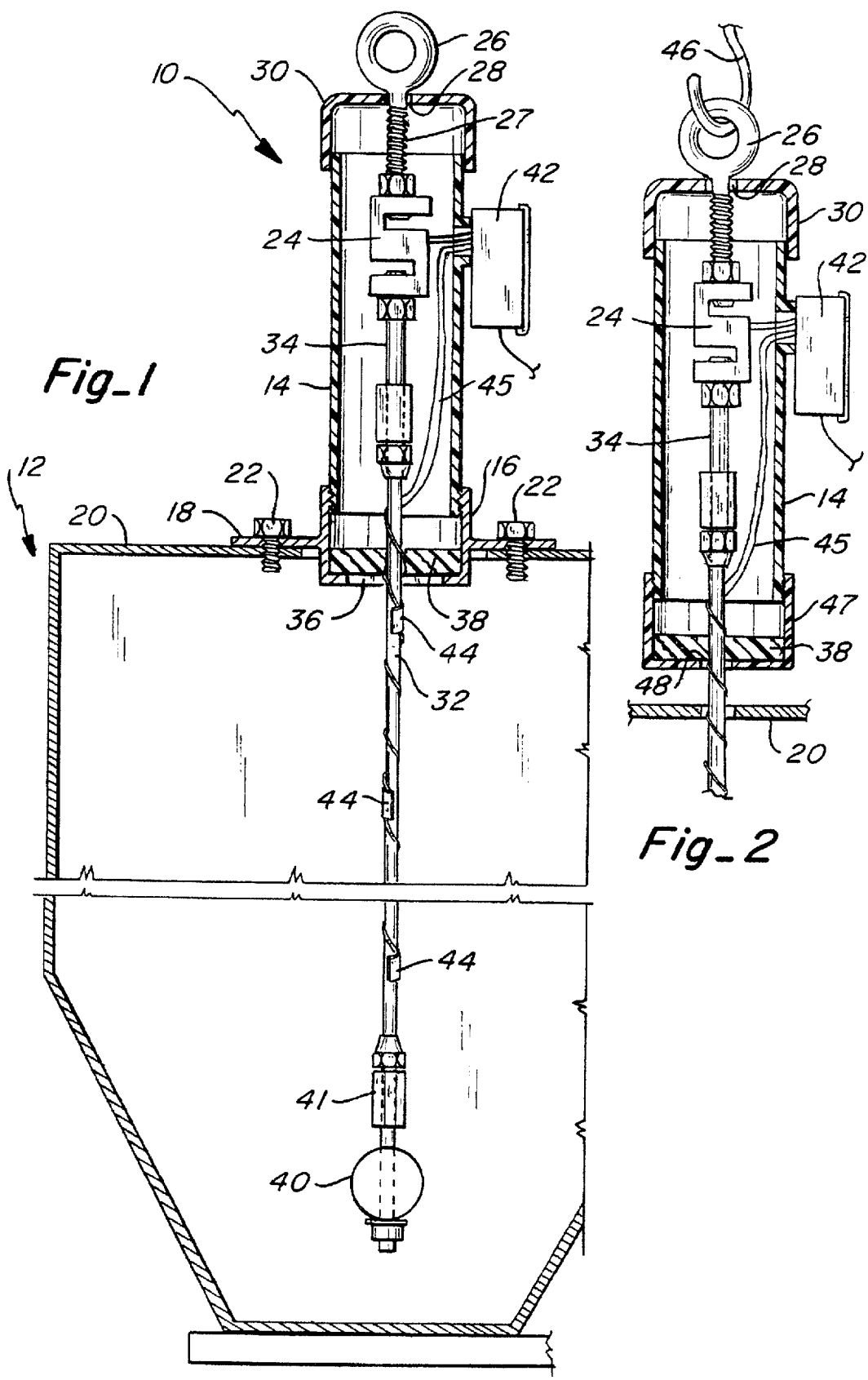
Fig_1
Fig_2

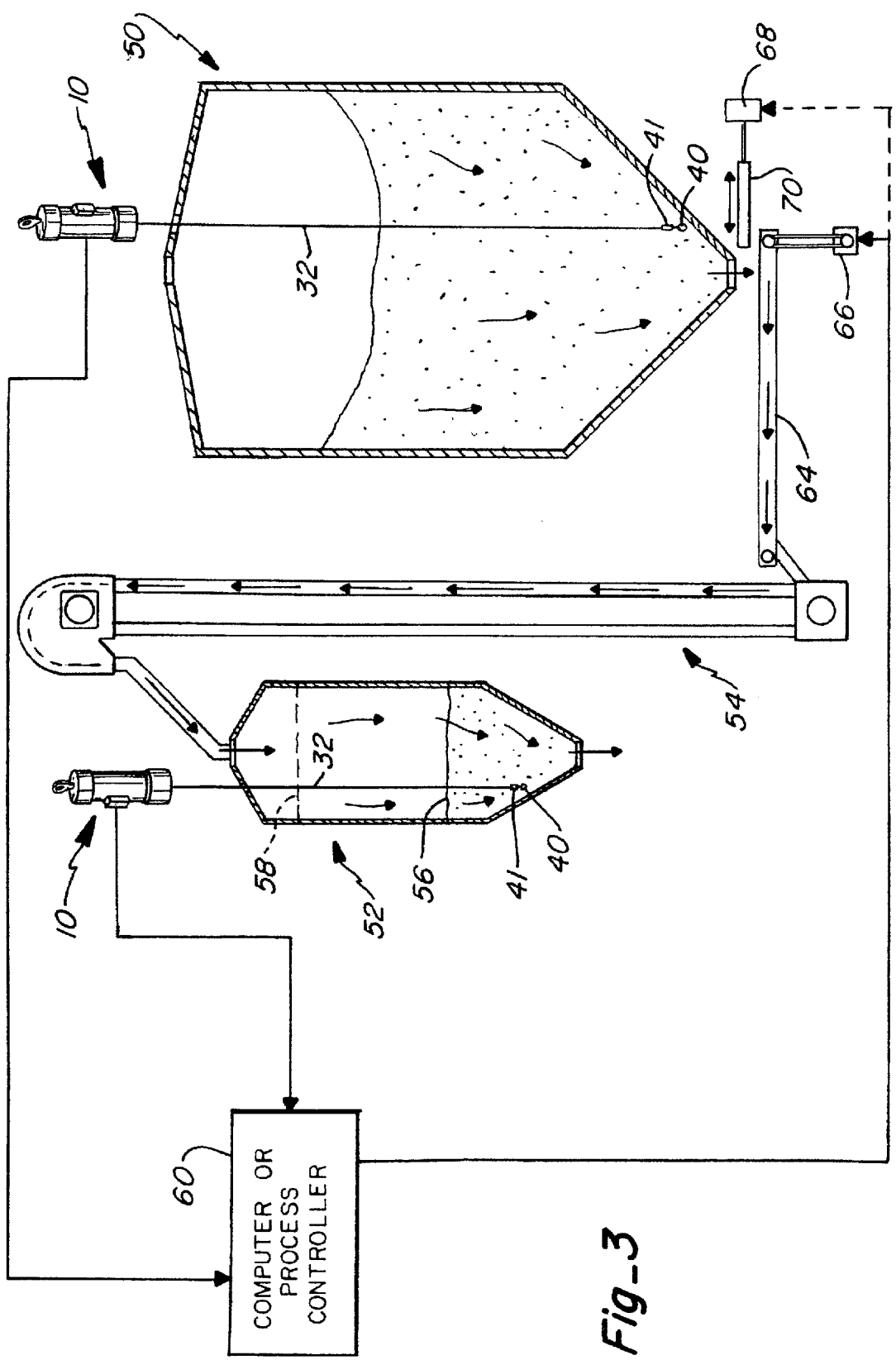
Fig_3

LEVEL SENSOR AND CONTROL

TECHNICAL FIELD

The invention generally relates to measuring and testing. More specifically, the invention relates to the art of depth gauges and especially to methods and devices for determining volume of dry fluent materials. This invention provides a level sensor and control for sensing and controlling the level of particulate material within a storage bin. More particularly, a cable is suspended within the storage bin by a load cell whereby the weight of the cable can be determined and compared with the weight of the cable plus the force of particulate material within the storage bin on the cable to determine the amount of particulate material in the storage bin.

BACKGROUND ART

It is important to know the amount of particulate material in a storage bin for inventory purposes and to control the flow of the particulate material into and out of the storage bin. Often, the particulate material is caustic, corrosive, dusty, humid, clumpy, hot, and/or cold. Additionally, the particulate material may be crusted along the bin walls, may have hang-ups, an uneven top surface and cavitations or stalagmites caused by wet spots. In some cases steam is present. In grain silos, it also is important to measure the temperature at numerous locations within the silo to identify hot spots so that the grain can be agitated to minimize spoilage.

Many devices have been designed for the purpose of measuring the amount of particulate material in the storage bin. However, many are very expensive and cannot operate properly for long periods of time in the hostile environment described above. The most relevant prior art is discussed below.

McGookin U.S. Pat. No. 4,276,099 and McGookin U.S. Pat. No. 4,276,774 each disclose a device which senses both temperature and particulate material levels wherein the level of material within a silo is determined by weighing the portion of the cable above the level of the material by dropping the upper end of the cable so that there is slack in it whereby the weight of the cable above the material is weighed by a suitable scale and is compared to the total weight of the cable when the silo is empty.

Flickerstein et al. U.S. Pat. No. 4,910,878 is directed to a specific cam device for placing slack in the cable and measuring the weight of it.

Russian Patent No. S.U. 438,881 and French Patent No. 1,405,203 are each directed to a device for measuring the weight of the cable above the level of the material in a silo.

Each of these inventions is satisfactory for its intended purpose. However, each of them requires moving parts, such as a motor, for moving the upper end of the cable up-and-down so that measurements of the weight of the cable can be taken. This adds to the complexity, expense and chance that the device will fail after repeated use.

Other existing technologies are commercially available and used for level sensing. These are single point sensors such as: (1) a capacitance probe which senses if material is present around the probe; (2) a rotary shaft with paddles wherein the particulate material in the storage bin stops paddle rotation; (3) a lightly spring-loaded diaphragm which triggers a proximity switch in response to particulate material pressure on the diaphragm; and (4) a tilt switch, which is normally vertically hanging, having a probe which is pushed laterally, i.e., tilted by the particulate material pressure on the probe.

While single point sensors are relatively inexpensive, it is difficult to determine or calculate the correct load to position the single point sensors due to the stored particulate material's angle of repose, moisture content, foreign material content, etc. For the diaphragm type single point sensor, it is necessary to cut a hole in the sidewall of the storage bin to install it. If the installer selects the wrong location, another hole must be cut in the tank to reposition the sensor and the electrical connections must be redone.

Additionally, there are continuous sensors such as: (1) sonic sensors which emit sound waves, measure the time for the sound wave to return, translate this difference in time into a distance and use digital signal processing algorithms to process the returned signal for a true signal, minimizing background noise; (2) radar sensors which use a high frequency signal traveling on a transmission line to measure empty space in the silo; and (3) a plum bob dropped from a spooling device which measures the distance that the plum bob moves. These continuous sensors are very expensive and can be adversely affected by the harsh conditions within the storage bin thereby requiring frequent maintenance.

DISCLOSURE OF THE INVENTION

The present invention is directed to a sensor for measuring the level of free-flowing particulate material in a storage bin. The sensor comprises an electronic load cell fixedly positionable at the upper end of the storage bin and having the upper end of the cable attached thereto to suspend the vertical cable in the storage bin so the lower end of the cable is adjacent to lower end of the storage bin. The load of the cable alone provides a signal indicative of an empty storage bin, and the load of the cable plus the downward force of any particulate material in the storage bin on the cable causes the electronic load cell to provide an output signal proportional to the amount of particulate material in the storage bin. A signal readout device is responsive to the output signal to provide a readout indicative of the amount of particulate material in the storage bin. One or more thermocouples may be attached along the cable to provide a signal indicative of the temperature of the particulate material at the location of the thermocouple.

The signal readout devices may include a process controller for receiving the output signal, for providing a low storage bin level output signal when the level of the particulate material in the storage bin falls below a predetermined low level, and for discontinuing the low storage bin level output signal when the level of the particular material in the storage bin exceeds a predetermined high level. A conveyor assembly or any kind of material supply system can be located adjacent to the storage bin. Such supply system is activated by the low level storage bin output signal to provide particulate material to the storage bin when the level of particulate material in the storage bin falls below the predetermined low level. The supply system is deactivated when the low storage bin level output signal is discontinued by the process controller, such as when the level of the particulate material in the storage bin reaches or exceeds the predetermined high level.

The process controller, which includes a clock, also can provide a real time readout of the rate of discharge of the particulate material from the storage bin. Since the process controller can be located at any remote location, this discharge rate can be monitored anywhere.

BRIEF DESCRIPTION OF THE DRAWINGS

FIG. 1 is a fragmentary, vertical section of a storage bin with the level sensor of this invention mounted thereon;

FIG. 2 is a fragmentary, vertical section of an alternative mounting for the level sensor for of FIG. 1; and FIG. 3 is a diagrammatical illustration of the use of the process controller to regulate the level of particulate material within a surge bin between a preselected low level and a preselected a high level.

BEST MODE FOR CARRYING OUT THE INVENTION

In accordance with this invention and as shown in FIG. 1, a load or level sensor 10 is used in conjunction with a storage bin 12 such as the type used for storing particulate material. The term "storage bin" as used herein is intended to include any type of storage container of which includes, but is not limited to, a silo, vessel or tank. A storage bin defines an interior volume suited to receive particulate material. Typically, the interior volume is bounded at its lower end by a bottom or floor of the storage bin. At its upper end, a top wall often covers the interior volume, although other structures such as beams or rafters may define a practical top limit to the volume suited to receive particulate material.

A load-measuring component of the level sensor 10 is mounted with respect to a storage bin at a position with height sufficient to be above whatever amount of particulate material is to be measured in the storage bin. For purposes of explanation and not limitation, the mounted height of the load-measuring component will be referred to as at or near the top of the storage bin, although any position at or above the level of particulate material is adequate for performing the measurement.

A mounting means carries, supports, suspends or otherwise holds the load-measuring component of the level sensor with respect to the storage bin in a suitable manner to permit the sensor to measure applied loads. The load-measuring component of load sensor 10 may be housed or carried within a protective housing 14. This housing may be of any type or configuration, including but not limited to the illustrated configuration in which the housing 14 is cylindrical. Typically, one end of the housing 14 is attached to or supported from the storage bin or a structure in a fixed position relative to a storage bin. For example, a lower end of housing 14 may be received in a base 16, as illustrated in FIG. 1. The lower end of the housing may be fixed to the base by threads or other suitable joining means. In one suitable mode of installation, the base 16 is configured with a peripheral flange 18 that can be positioned to overlap a portion of a top wall 20 of storage bin 12. The housing can be secured to top wall 20 by use of a plurality of fasteners such as bolts or screws 22.

The top of housing body 14 may carry a cover 30. Conveniently, threads may attach cover 30 to the upper end of housing body 14. A load-measuring component of the level sensor 10 is a load cell 24 carried within the housing between the cover 30 and base 16. As one example of a suitable means for carrying the load cell 24 in the housing 14, one end of the load cell 24 is joined to and supported by a threaded shaft 27 that extends through an aperture 28 in cover 30. At the outer face of cover 30, the threaded shaft defines an enlarged stop member, such as eyelet 26, that is of sufficient size that it cannot pass through hole 28.

When the housing 14 is mounted to a fixed support as shown in FIG. 1, the stop member will engage cover 30 and will suspend the load cell 24 from the cover 30. The load cell preferably is suspended in a position within the housing so that the housing protects the load cell 24. Although eyelet 26 is shown as one example of a stop member, the stop member may be any mechanism or enlargement associated with shaft 27, including but not limited to a flange at the top of the shaft or an external washer supported by an external nut on shaft 27. Further, aperture 28 in cap 30 may be threaded and may engage the threaded portion of shaft 27 to support the load cell from cover 30.

While one way to mount the load cell 24 is by supporting the housing 14, another way is by suspending the load cell 24, itself. A mounting means may carry, support, suspend or otherwise hold load cell 24 from its top end or from a structure associated with the load cell. By way of example and not limitation, a suitable means for hanging the load cell is an eyelet 26, a hook, or any other structure capable of engaging an overhead hanger. The illustrated arrangement of FIG. 2 shows the use of an eyelet joined to the top end of threaded shaft 27. An equivalent way of hanging the load cell is by use of any hook or other suspending structure joined to load cell 24. Thus, the load cell may be mounted and supported in a position above the particulate material and generally near the top of a storage bin by any suitable means, whether joined directly or indirectly to the load cell, the housing, or an associated structure.

The use of an eyelet, hook, or other component of rod 27 as a mounting means has the added advantage of allowing the mounting means to serve a second purpose as the stop means. A preferred structure permits and provides both a mounting means associated with or joined to the housing and a mounting means associated with or joined to the load cell, so that either the load cell 24 or the housing 14 can be used to secure the load cell in a desired position within or over a storage bin.

The load cell 24 suspends a vertical cable 32 within storage bin 12. At its upper end, the cable depends from a coupling 34 preferably located within housing body 14 and attached to the lower end of load cell 24. Base 16 defines an opening 36 through which cable 32 extends.

Optionally, a packing 38 is positioned at or near opening 36 or inside base 16 to minimize the transfer of contaminants from storage bin 12 to the load cell 24. Such a packing 38 may be constructed of cloth, burlap, sponge or other suitable material. Depending upon the application with which they are to be used, housing body 14 and cover 30 may be made of a plastic material, such as polyvinyl chloride, or of a metal material. Also, body 14 could be made by injection molding or other methods and could be made of other suitable materials, all as is apparent to one skilled in this art.

The term "cable" as used herein is intended to cover not only braided strands but also to include a monofilament plastic material, a rod or other linear member, depending upon the material being stored in the storage bin. It is important that the material from which the cable is made not be degenerated by particulate material in the storage bin.

Advantageously, an optional, supplemental weight 40 may be attached to the lower end of cable 32 by connector 41 so as to put a load beyond the weight of the cable on load cell 24. The use of such a supplemental weight will aid in providing a signal through junction box 42 to a monitor (not shown), which may be at a remote location. The use of weight 40 may be necessary when the cable is very light in weight to provide an initial "empty" reading of sufficient value for use with the selected load cell 24. If the cable is sufficiently heavy, no weight is necessary on the end thereof.

The configuration of weight 40 will change with the changing characteristics of different materials, depth of the storage bin, and many other variables. In general, the weight will be larger to create more load in small, short storage bins and will be smaller in storage bins where the depth of material is greater.

The signal from load cell 24 represents an "empty" reading when there no particulate material in the storage bin, when the top of the particulate material is below the bottom of the cable 32, or when the quantity of remaining particulate material is too small to exert a force upon the cable that is detectable by the load cell in use. When the level of particulate material in the storage bin is above the bottom of cable 32, and especially when the storage bin is full, an additional load will be placed on the cable. This additional load is proportionate to the amount of material in the storage bin. Thus, when the storage bin is filled to capacity with a known amount of material, a "full" level is achieved and a second reading is provided to the monitor representing the signal achieved when the storage bin is full. Readings in between these full and empty levels are proportionate to the amount of material in the storage bin between the pre-established "empty" and "full" readings.

From knowledge of what material is presently occupying a storage bin, the volume of the material or of the storage bin, and the typical density of the material, additional useful calculations can be performed. The monitor can include a digital indicator that displays the real-time inventory of the material in the storage bin in desired units of weight, such as pounds or kilograms. Therefore, references to a "quantity" of material in the storage bin are interchangeable with references to level, amount, or any other measurement. For example, quantity may refer to weight, volume, proportion of storage bin size, proportion of the volume within the storage bin, or proportion of volume measurable by the load cell as it may be mounted with respect to the storage bin.

Sometimes, it is important to monitor local temperature levels within the stored material in order to identify hot spots so that the stored material can be mixed to minimize spoilage. Optionally, the cable 32 can be used in conjunction with thermocouples, as is well known in the art. Therefore, a plurality of spaced apart temperature sensors 44 can be attached along cable 32, as shown in FIG. 1, and connected to electrical wires 45 and junction box 42 to a suitable temperature readout (not shown).

In FIG. 1, the housing 14 and contained load cell are shown mounted on a top 20 of storage bin 12, as previously described with reference to FIG. 1. While this may be suitable for some applications, the top 20 of the storage bin may not be sufficiently strong to support the housing and load cell when a heavy load it is placed on cable 32 by the material being stored in the storage bin. In such a case, the housing and load cell must be supported from a different structure of the storage bin, as previously described with reference to FIG. 2. A suitably supported hanging means such as a hook 46 can suspend the housing 14 or load cell 24. For example, such a hanging means can be connected to a rafter (not shown) in a building where the storage bin is located or to some other structure that is sufficiently strong to bear the load that will be placed on the cable when the storage bin is full. In this embodiment, housing 14 is free-floating around the load cell but continues to provide its protective function. The housing is provided with a bottom 47 having an opening 48 through which cable 32 extends.

It is readily apparent that this invention operates without any moving parts and is not subject to contamination or faulty readings due to dust, steam, humidity, or other than unfavorable conditions within the storage bin.

The present invention can be used in combination with a controlled supply means such as a conveyor or gate for delivering a flow of particulate material from one or more primary storage bins 50 to one or more surge bins 52, as shown in FIG. 3. Conveniently, both primary storage bin 50 and surge bin 52 are provided with sensor units 10, each supporting a cable 32. The sensor unit from each bin provides a signal proportionate to the level of particulate material in each bin. Surge bin 52 is supplied with particulate material from primary storage bin 50, such as by a conveyor assembly 54 positioned there between. The conveyor assembly 54 may be composed of any type of bulk material conveyors, including but not limited to a screw conveyor, a belt conveyor, a chain conveyor, a pneumatic conveyor, a bucket elevator, or combinations of these. For example, conveyor assembly 54 may include a continuous running vertical elevator 62 supplied by a horizontal conveyor 64, which can be activated by motor 66.

Suitable control of the supply means will keep the level of particulate material in surge bin 52 between a preselected "low" level 56 and a preselected "high" level 58. This is accomplished by selecting the desired low and high readings for the surge bin 52 and inputting these level readings into a computer or process controller 60, which may be remotely located. The process controller 60 receives a signal from sensor unit 10 associated with the surge bin, as previously described. The process controller is programmed to respond to the signal by maintaining the level of particulate material in surge bin 52 between the preselected low and high levels.

In typical usage, the surge bin 52 is supplying particulate material through its bottom discharge port to an external receiver. When the level of particulate material in surge bin 52 drops to "low" level 56, thereby creating a match with a low level reading previously computed, process controller 60 provides an output signal to motor 66, which activates the flow of particulate matter along conveyor system 54 by moving horizontal conveyor 64 to supply additional particulate material from the primary storage bin 50 to surge bin 52. When the level of the particulate material in surge bin 50 reaches the "high" level 58 so that there is a match with the high level reading previously inputted, the process controller 60 deactivates motor 66, such as by turning off the output signal to motor 66 or sending a termination signal so that horizontal conveyor 64 discontinues operation. This cycle can continue as material is discharged from the bottom of surge bin 52 causing the level of particulate material drop from high level 58 to low level 56.

Alternatively, horizontal conveyor 64 can be continuously running, and a solenoid 68 provides flow control by selectively operating a control gate 70 at the lower, discharge end of primary storage bin 50. The solenoid 68 regulates the flow of particulate material from primary storage bin 50 onto horizontal conveyor 64. A low level reading causes the process controller to send a signal to the solenoid to open gate 70, while a high level reading causes the process controller to send a signal to the solenoid to close gate 70. Thus, flow control can be achieved by selective actuation of an active delivery device such as a conveyor; or it can be achieved by actuation of a passive delivery device such as a gate.

The process controller 60 also can receive readings from the sensor unit 10 in the primary storage bin. The proportionate load on the cable 32 in bin 50 allows the processor to monitor the amount of grain or other particulate material in the primary storage bin 50. When the level in the surge bin 52 is being monitored and controlled as previously described, readings from the primary bin allow a cross-check that the controlled supply means is operating properly and without loss. Readings from the primary bin are useful to enable a simplified estimate how much particulate material has been delivered during a defined job or span of operation, while the readings from the surge bin may be favored to ensure continuity of delivery and adequate delivery rate.

It should be understood that the values measured by the level sensor are not measurements of the actual amount of particulate material in the storage bin but rather provide ratios proportional to the amount of particulate material in the storage bin. By way of example, suppose that in a surge bin 52, the cable 32 together with its attached weight 40 have a combined weight of twenty pounds when hanging free of contact with particulate material in the bin. This weight of twenty pounds will be assumed to be sensed by electronic load cell 24 and to cause the load cell to produce a reading corresponding to a twenty pound load, which reading is the "empty" reading and is assigned a significance of "zero" particulate matter in the surge bin. Further suppose that the same surge bin is filled with a known quantity of material or to a known high level that will constitute a "full" storage bin. A corresponding "full" reading of the load on the electronic load cell 24 is two thousand pounds. This full reading does not signify that two thousand pounds of particulate material is in the surge bin; rather, it signifies that the bin is considered to be full. However, such readings easily are converted to other measurements of weight or volume, as mentioned above.

In this hypothetical example, it is desired to keep the level of the particulate material within surge bin 52 between a high of 80% and a low of 20% of the full level. The processor 60 has been supplied with data corresponding to an output from the load cell corresponding to a load of twenty pounds and a load of two thousand pounds on cable 32. Thus, the reading in the process controller 60 for activating conveyor system 54 will be set between a high of 1600 pounds and a low of 400 pounds. Initially, the process controller 60 may provide an output signal to activate motor 66 or solenoid 68, as described above, to initiate a transfer of particulate material from primary storage bin 50 to surge bin 52. When the reading created by the load cell in the surge bin 52 reaches or exceeds 1600 pounds, motor 66 or solenoid 68 will be deactivated. The supply means will remain deactivated as particulate material is dispensed from surge bin 52 until such time as the level of the particulate material reaches the "low" level 56, signified by a load of four hundred pounds or less on the cable 32 in the surge bin. At this low reading, the process controller 60 will reactivate motor 66 or solenoid 68 to cause conveyor system 54 to transfer additional particulate material from primary storage bin 50 to surge bin 52.

The force exerted on the cable by the particulate material will vary with the type of particulate material in the storage bin. For example, grain weighs approximately 50 pounds per cubic foot, whereas sand weighs approximately 95 pounds per cubic foot. Thus, in a given size storage bin a given level of grain that would exert a lower force on the cable than the same level of sand in the same storage bin. Regardless of what material is in the storage bin, the ratio between the various readings discussed above for each material provides a useful basis for measurement.

Another important feature of this invention is that process controller 60, which is well known in the art to incorporate a clock function, can be used to provide a real time determination of the rate of usage for the material being dispensed from surge bin 52. This capability enables the calculation of usage rates for the dispensed material on an instantaneous basis or over any chosen time interval. Knowledge of usage rates is desirable for improved production management. The clock function of a process controller 60 allows rate data to be continuously available at a remote location and allows monitoring of production rates in real time. This is superior to calculating the rate of usage at the end of the run, the end of the shift, or the end of a particular time period.

From the foregoing, the advantages of this invention are readily apparent. A level sensor has been provided which has no moving parts so that it can be operated in virtually any environment of any storage bin. The level sensor measures the relative force on a cable hanging from a load cell within the storage bin and provides a ratio to a computer or process controller comparing the weight on the load cell when the storage bin is empty compared to the weight on the load cell when the storage bin is filled or partially filled with particulate material.

This invention has been described in detail with reference to particular embodiments thereof, but it will be understood that various other modifications can be effected within the spirit and scope of this invention.

What is claimed is:

1. A sensing apparatus for continuously measuring the level of free-flowing particulate material in a storage bin, said sensing apparatus comprising:

a storage bin, having an upper end and a lower end, for storing particulate material;

a vertical cable having an upper end and a lower end;

an electronic load cell sensing total applied load, consisting of the cumulative load of the cable plus the downward force applied to the cable by any particulate material in the storage bin, fixedly positioned at the upper end of said storage bin and having said upper end of said cable attached to said electronic load cell and suspending the vertical cable in the storage bin, the vertical cable having a length sufficient that the lower end thereof is adjacent to the lower end of the storage bin so that the load of the cable plus the downward farce of any particulate material in the storage bin on the cable causes the electronic load cell to provide a load cell output signal proportional to the amount of particulate material in the storage bin;

a signal readout device including a process controller for receiving said load cell output signal, for providing a low storage bin level output signal when the level of particulate material in said storage bin falls below a predetermined low level and for discontinuing said low storage bin level output signal when the level of particulate material in said storage bin reaches a predetermined high level; and a selectively operable supply means for supplying particulate material to the storage bin when activated, wherein said process controller activates said supply means to provide particulate material to said storage bin when the level of particulate material in said storage bin falls below sad predetermined low level and deactivates said supply means when the level of particulate material in said storage bin reaches said predetermined high level.

2. A sensing apapratus, as claimed in claim 1, wherein:

said storage bin is a surge bin;

said supply means is a conveyor; and further comprising a primary storage bin spaced from said surge bin and having said conveyor positioned therebetween for conveying particulate material from said primary storage bin to the surge bin.

3. A method of continuously measuring the level of particulate material within a storage bin, having an upper end and a lower end, said method comprising the steps of:

suspending a cable, having an upper end and a lower end within the storage bin from an electronic load cell attached to the upper end of the cable and mounted adjacent to the upper end of the storage bin so that the lower end of the cable is adjacent the lower end of the storage bin;

generating a first output signal from the electronic load cell indicative of the force created thereon by the weight of the cable to provide a storage bin empty reading;

filling the storage bin with particulate material;

generating a second output signal from the load cell indicative of the total applied load thereon, consisting of the cumulative load of the weight of the cable plus the downward force of the particulate material in the storage bin to provide a storage bin full reading;

changing the level of the particulate material in the storage bin;

generating a third output signal from the load cell indicative of the total applied load thereon, consisting of the weight of the cable plus the downward load created by the changed level of the particulate material in the storage bin; and comparing said first, second and third output signals to determine the level of particulate material in the storage bin after the level has been changed.

4. A method, as claimed in claim 3, including the further steps of:

sequentially changing the level of the particulate material in the storage bin;

generating sequential output signals from the load cell indicative of the total applied load thereon consisting of the weight of the cable plus the downward force of the particulate material in the storage bin with each sequential change in the level of the particulate material in the storage bin; and comparing said first, second and each sequential output signal to determine the level of particulate material in the storage bin after each sequential level change.

5. A method, as claimed in claim 4, including the further steps of:

determining the rate of discharge of particulate material from the storage bin in real time.

6. A method of maintaining the amount of particulate material in a storage bin between a predetermined relatively higher level and a predetermined relatively lower level, said method comprising:

providing a storage bin, having an upper end and a lower end, for storing particulate material;

suspending a cable, having an upper end and a lower end, within the storage bin from an electronic load cell attached to the upper end of the cable and mounted adjacent to the upper end of the storage bin so that the lower end of the cable is adjacent the lower end of the storage bin;

generating a first output signal from the electronic load cell indicative of the load thereon by the weight of the cable to provide a storage bin empty reading;

filling the storage bin with particulate material supplied by a conveyor;

generating a second output signal from the load cell indicative of the load thereon by the weight of the cable plus the downward force of the particulate material in the storage bin to provide a storage bin full reading;

selecting a predetermined low level signal and a predetermined high level signal proportional to the difference in the first and second output signals;

inputting the predetermined low level signal and the predetermined high level signal into a process controller;

positioning a conveyor system adjacent the storage bin for supplying particulate material thereto;

discharging particulate material from the storage bin;

comparing the signal from the load cell as the particulate material is being discharged from the storage bin with the predetermined low level signal until they match;

generating a control signal from the process controller in response to the matching of the signal from the load cell to the low level signal to activate the flow of particulate material along the conveyor assembly to refill the storage bin;

comparing the signal from the load cell as the storage bin is being refilled with the particulate material with the predetermined high level signal until there is a match; and terminating the control signal from the process controller in response to the match of the signal from the load cell and the predetermined high level signal.

7. A method, as claimed in claim 4, including the further steps of:

resuming the discharge of particulate material from the storage bin;

repeating the refilling of the storage bin each time the level of particulate material reaches the predetermined low level; and stopping the flow of particulate material along the conveyor assembly each time the level of the particulate material reaches the predetermined high level.

8. A method, as claimed in claim 7, including the further steps of:

providing a primary storage bin for supplying particulate material to the conveyor.

9. A method, as claimed in claim 7, including the further steps of:

placing thermocouples at selected places along the length of the cable; and supplying a signal from each of the thermocouples which is indicative of the temperature of the particulate material at the location, of each of the thermocouples.

* * * * *